United States Patent [19]
Takahashi et al.

[11] Patent Number: 5,297,134
[45] Date of Patent: Mar. 22, 1994

[54] LOOP MODE TRANSMISSION SYSTEM WITH BUS MODE BACKUP

[75] Inventors: Noboru Takahashi; Noriyuki Hattori, both of Aichi, Japan

[73] Assignee: Mitsubishi Denki Kabushiki Kaisha, Tokyo, Japan

[21] Appl. No.: 818,832

[22] Filed: Jan. 10, 1992

[30] Foreign Application Priority Data

Jan. 11, 1991 [JP] Japan ............................. 3-001996

[51] Int. Cl.⁵ .............................................. H04J 1/16
[52] U.S. Cl. ................................. 370/16.1; 370/16
[58] Field of Search .............. 370/16.1, 16, 13, 13.1, 370/55, 85.5, 85.12, 85.15; 340/825.05

[56] References Cited

U.S. PATENT DOCUMENTS

| | | | |
|---|---|---|---|
| 4,914,625 | 4/1990 | Billian | 370/16 |
| 4,964,095 | 10/1990 | Tyrrell et al. | 370/16 |
| 5,079,759 | 1/1992 | Kajiyama | 370/16 |

FOREIGN PATENT DOCUMENTS 0397196 11/1990 European Pat. Off. .
62-59439 3/1987 Japan .

OTHER PUBLICATIONS

Patent Abstracts of Japan, Abstract of Published Application No. 57-92946 to Sadao Mizokawa, Jun. 9, 1982.
Patent Abstracts of Japan, Abstract of Published Application No. 57-80847 to Yoshihisa Okamoto, May 20, 1982.
Patent Abstracts of Japan, Abstract of Published Application No. 57-129048 to Sadao Mizokawa, Aug. 10, 1982.
Patent Abstracts of Japan, Abstract of Published Application No. 55-150636 to Yoshio Sashita, Nov. 22, 1980.
Mizokawa 'Patent Abstract of Application No. 57-92946' Jun. 9, 1982.

*Primary Examiner*—Douglas W. Olms
*Assistant Examiner*—Shick Hom
*Attorney, Agent, or Firm*—Sughrue, Mion, Zinn, Macpeak & Seas

[57] ABSTRACT

A transmission system formed by a master station and a plurality of satellite stations which are connected by a transmission line into a loop, the data and command signals from the master station being passed sequentially from station to station around the loop. A failure in a satellite station that prevents further loop transmission is detected by watchdog timers in one or more successive stations. As a result, the stations detecting the failure switch themselves into a bus-mode of operation, the master station switches itself and the remaining stations into the bus-mode of operation. The switching back to the loop-mode of operation can be performed under control of the master station automatically, upon detection that the failure has been corrected. The switching also can be performed under external command.

16 Claims, 2 Drawing Sheets

LOOP MODE TRANSMISSION SYSTEM WITH BUS MODE BACKUP

BACKGROUND OF THE INVENTION

1. Field of the Invention

The present invention concerns a system for communicating data and control signals between a master station and plural satellite stations which may have a slave relation to said master station.

Conventionally, a transmission network may be organized to operate in a loop mode for transmitting information in serial data format between the master and one or more satellite stations.

2. Description of the Prior Art

FIG. 4 illustrates the configuration of a conventional loop mode transmission system comprising a plurality of stations 1 through 6. In the figure, a single master station 1 serves to monitor the system's operation and control the polling of other satellite or slave stations that also are connected in the loop. The master station 1 is connected directly to only two adjacent slave stations 2 and 6 by transmission links 7 and 12, respectively. The remaining satellite stations 3 through 5 are connected only to adjacent slave stations by transmission lines 8-11 and communicate with the master station through other slave stations in the loop. Each of satellite stations 2 through 6 has transmission equipment, including a computer and input/output devices, for receiving/transmitting data from/to the master station 1.

In an operation of the system in FIG. 4, data for one or more satellite stations in the network is addressably transmitted from the master station 1 via the transmission line 7 to satellite station 2. Station 2 selects the data addressed to it and passes on the balance of the data to satellite station 3 via the transmission line 8. Station 2 may also insert into the serial stream data addressed to the master station. In a similar fashion, each of stations 3–6 remove their addressed data and pass the remainder, including data addressed to the master station, to other stations through respective transmission circuits 9–11. The last station 6 transmits the assembled data stream via the line 12 to the master station. Thus data is transmitted in the transmission system in a loop mode.

In a loop transmission system, both data and control signals that are transmitted from the master station are regenerated, amplified and relayed to the next satellite station in the loop. Consequently, the transmission distance can be made long. Moreover, the transmission speed can be raised to a high rate. However, if an abnormality in any of the satellite stations occurs, amounting to a station breakdown, the entire system will be shut down.

FIG. 5 illustrates the configuration of a conventional, addressable data transmission system that is organized to operate in a bus mode. In the figure, the master station 13, which controls the data transmission, is connected to plural satellite stations 14–17 that are operative to receive/transmit data from/to the master station by means of input/output devices and to process data by a resident computer. A transmission trunk line 18 connects each of the satellite stations in parallel with the master station. Lines 19–22 are the branch lines that respectively connect the stations 14–17 with the trunk line. Each of the stations inputs only the transmitted data that is addressed to it.

Next, the function of the bus mode of data transmission is described in FIG. 5. As shown in the figure, data transmission from the master station 13 is transmitted through the transmission trunk line 18; the transmission is received by the satellite stations 14–17 through the branch lines 19–22 and input in the respective satellite stations.

In a transmission system operative in a bus mode, the transmission trunk line 18 is not interrupted by any of the satellite stations connected to it. Hence, the impedance of the satellite stations is set higher than that of the transmission trunk line. Thus, if an abnormality should occur within any of the satellite stations, its breakdown will not affect the other stations. The master station can continue to transmit data and communicate with the satellite stations other than the one affected by the breakdown. However, unlike the loop mode, because this mode does not employ the regenerative relay method, its transmission distance and transmission speed is limited.

It is an object of the present invention to overcome the problems that occur in the conventional transmission system operating in a loop mode when an abnormality occurs in any single satellite station in the loop, such that the operation of the entire system breakdowns.

It is a further object of the present invention to identify a station in which the abnormality occurs.

It is yet another object of the present invention to avoid any significant delay after a station breakdown before system operation can be restored.

Finally, it is an object of the present invention to provide a network design that is well suited for long-distance, high-speed transmission.

In particular, the present invention is designed to resolve the problems in the conventional loop mode and bus mode systems while being capable of transmitting data at a relatively high speed. The system is designed so that even if abnormalities occur in a number of satellite stations, the system will not breakdown and can continue to transmit data.

SUMMARY OF THE INVENTION

In a first embodiment of the invention, a transmission trunk is used to exchange data and control signals between the master station and a number of satellite stations, where the data and signals are transmitted from the first of the satellite stations to each of the following in succession in a loop transmission mode; when in the loop transmission mode, operational abnormalities in the satellite stations are automatically detected and the improved system switches from the loop transmission mode to the bus transmission mode. This enables the direct exchange of signals between the master station and a plurality of satellite stations, utilizing the existing trunk transmission line. Specifically, in the normal loop transmission mode, when the master station detects the occurrence of an abnormality in any of the satellite stations, the master station can switch from the loop transmission mode to the bus transmission mode. This enables continued direct communication between the master and normal satellite stations via the trunk line.

In a second embodiment of the invention the master station is equipped with means for detecting the restoration of operation at any of the satellite stations by receiving a signal from an abnormal station that the abnormality has been repaired. Together with this feature, the master station is equipped with means for issuing signals to the plurality of satellite stations that switches the bus transmission mode back to the loop transmission mode. The plurality of satellite stations are likewise each provided with a means for switching from the bus transmission mode to the loop transmission mode in response to the signals from the master station. Specifically, when the master station detects that an abnormal satellite station has been restored by receiving a message dispatched by that slave station, the master station dispatches a command switching the mode of transmission from the bus transmission back to the loop transmission mode to all satellite stations. The means for switching the transmission mode is responsive to the command of the master station and switches from the bus transmission mode to the loop transmission mode.

In the third feature of the invention, the master station and a number of satellite stations communicate over the trunk communication line, whereby messages from the master station are received by each of the satellite stations and messages from each of the slave stations may be transmitted to the master station, thus permitting information to be exchanged among the stations. In this case, the message is transmitted from the first station to each of the successive stations over the transmission system operating in a loop mode. An external means for switching the mode of transmission from the loop mode to the bus mode of transmission, utilizing the aforementioned trunk transmission line, also may be provided. Specifically, switching is externally implemented between the two transmission modes. The master station transmits a message received by the aforementioned satellite station; and communication between the two is established. In the meanwhile, the message is transmitted to each of the following stations on the loop in succession. In the externally implemented switching system the loop mode of transmission is switched to the bus mode so that the master station directly communicates with the satellite stations by the bus transmission mode via the trunk transmission line.

DESCRIPTION OF THE PREFERRED EMBODIMENTS

Figure 1:
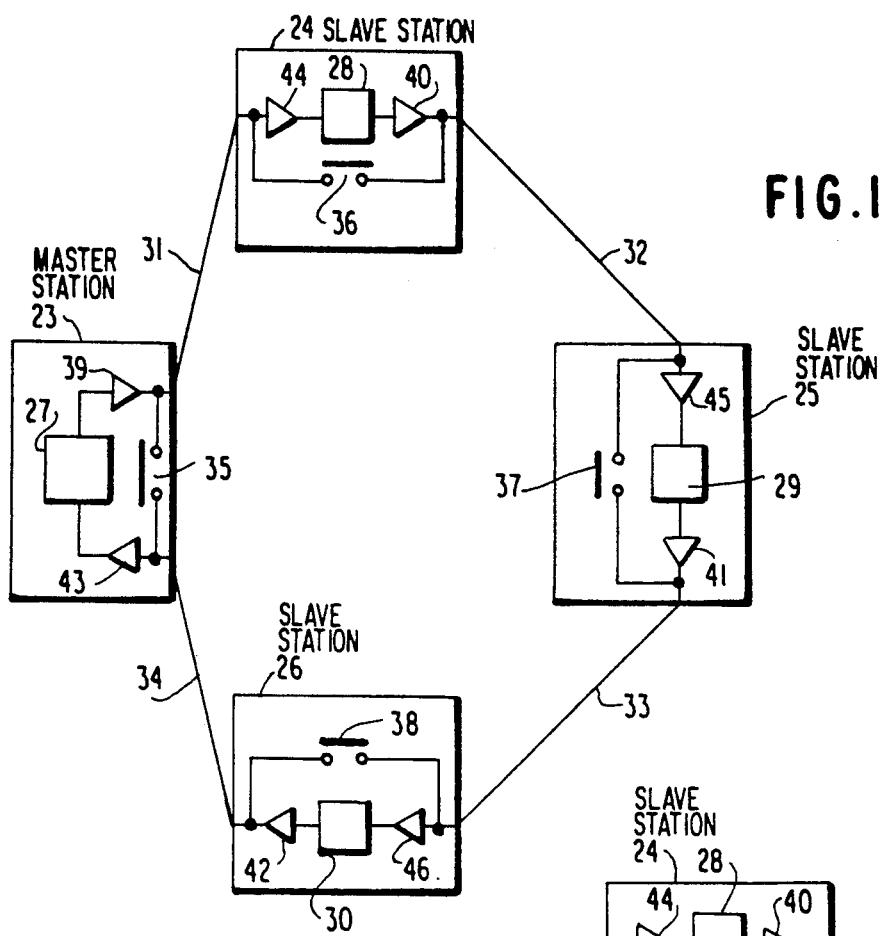
FIG. 1 shows an example of the application of the present invention to a transmission system.
Figure 2:
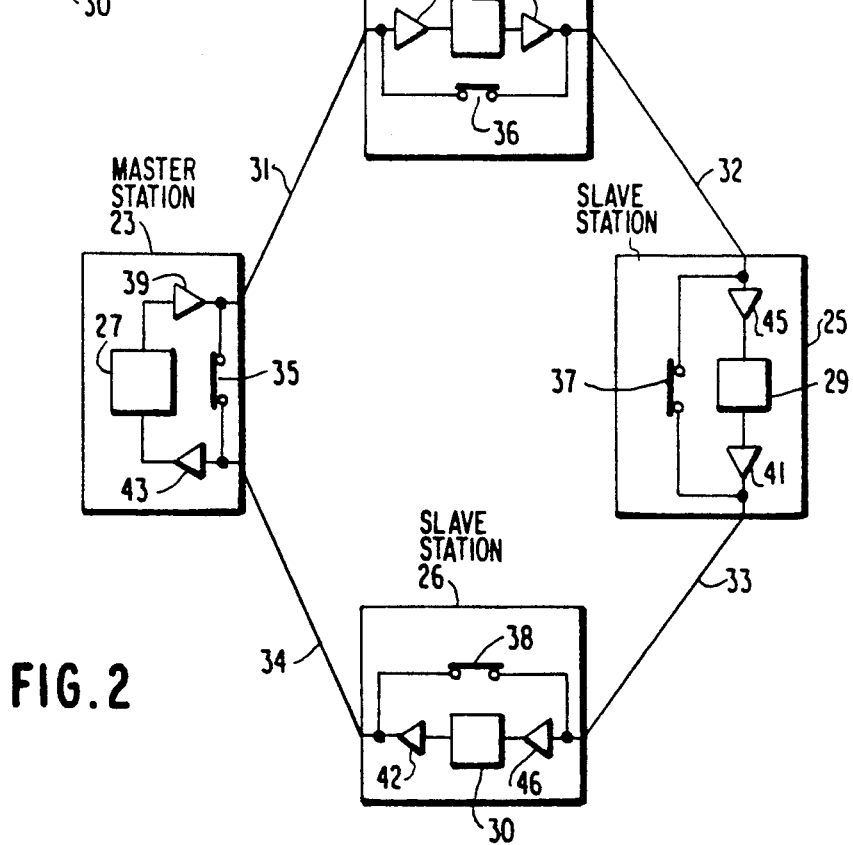
FIG. 2 illustrates the method of switching the transmission mode of FIG. 1.
Figure 3:
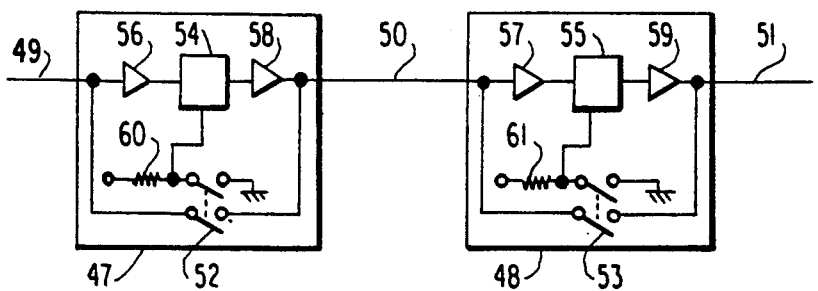
FIG. 3 illustrates a configuration of circuitry that makes possible the switching of the transmission modes.
Figure 4:
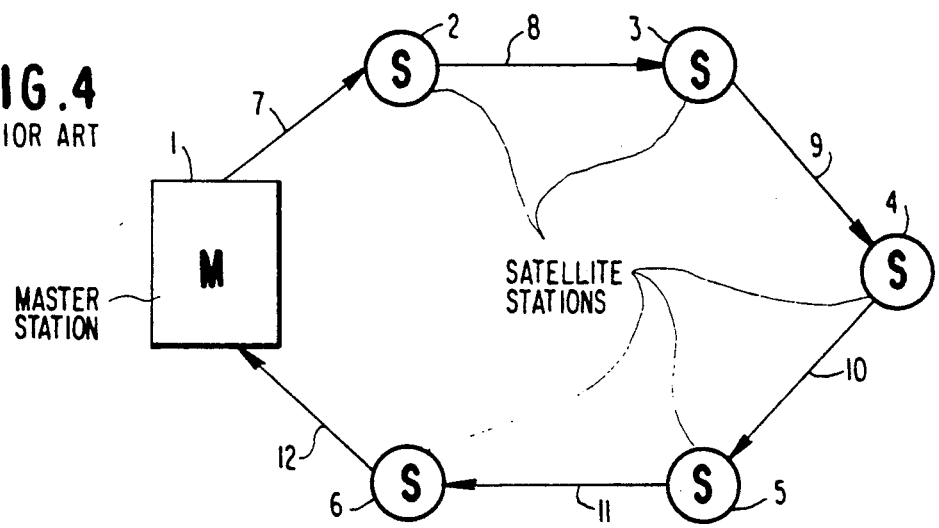
FIG. 4 illustrates the conventional loop transmission system.
Figure 5:
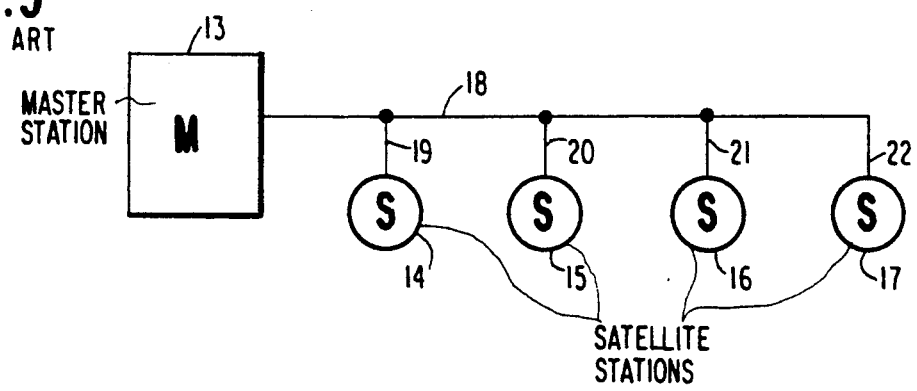
FIG. 5 illustrates the conventional bus transmission system.

Examples of the first and second embodiments of the invention may be described with respect to FIGS. 1 and 2; the third feature is described with respect to FIG. 3. Items in the figures that bear the same symbols are identical or functionally equivalent.

FIG. 1 illustrates a transmission system representing the first feature of the invention, the configuration of the loop transmission mode. FIG. 2 illustrates both the first and second feature of the invention, and the condition under which the loop transmission mode of FIG. 1 is switched to the bus transmission mode. Specifically, FIG. 1 shows how under normal conditions the master station 23 and each of the plural satellite stations 24, 25 and 26 function normally and transmits data in the loop transmission mode. The master station 23 transmits to each of the satellite stations various control and data signals. From the internal circuitry 27 of master station 23, data is output by transmitter 39 to transmission line 31 and is received by the receiving device 44 of satellite station 24. The internal circuit 28 of the satellite station 24 selects and removes from the serial stream the data addressed to it and transmits the remainder of the date via transmitting device 40 and through the transmission line 32 to the next satellite station 25. Likewise satellite stations 25 and 26 respectively receive, remove and transmit the data in the loop circuit. Data from each slave that is intended for the master station also may be added to the serial data stream as it proceeds to the master station.

If an abnormality occurs in a satellite station and its operation breaks down, the integrity of the communication is maintained, as illustrated in FIG. 2. For example, when the operation of satellite station 25 breaks down as a result of an abnormality in its receiver, transmitter or processor, the station will not be able to transmit data to satellite station 26. Since the normal operation of the data transmission system in a loop mode ordinarily results in data being transmitted around the loop periodically, the absence of periodic data can indicate a failure somewhere in the loop. A conventional "watch dog timer", which is operative to trigger an alarm unless reset by the occurrence of data on the loop at a frequency comparable to the normal data period, can be used. Thus, when data periodically transmitted to satellite station 26 ceases to be transmitted, an abnormality in the transmission is assumed and the timer will output a signal that turns ON the bus mode relay 38, as shown in FIG. 2. If there were additional satellite stations downstream of the failure, their watch dog timers also would trigger their corresponding bus mode relays. The master station 23 also detects the transmission abnormality, because it does not receive the data stream on a periodic basis, and turns ON its own bus mode relay 35. Moreover, the master station 23 transmits a command to subsequent satellite stations in the direction of transmission around the loop, such as station 24, informing them of the occurrence of the transmission abnormality. As a result bus mode relay 36 of satellite station 24 also is turned ON.

As to station 25 where the abnormality occurred, if the failure is in the receiver, the stations's own watchdog timer will actuate the relay 37. If the failure is in the processor or the transmitter, the command from the master that is forwarded by slave 24 will actuate the relay 37.

Once all of the bus mode relays 35-38 have been activated, the master station 23 and the satellite station 24 to 26 are connected in parallel with the transmission cable. The transmission may include a diagnostic message that requires a response by each satellite station and the master station starts transmitting data in the bus mode. When the master station 23 attempts to communicate with satellite station 25, however, due to its breakdown, communication is impossible. Consequently, satellite station 25 will be identified by the master station as the one which is abnormal.

FIG. 2 describes the application of the second feature of the invention. In the figure, the operation of satellite station 25 was abnormal; thus, data transmission was switched to the bus mode. All of the bus mode relays 35-38 are turned ON. The master station 23 continues to periodically transmit signals to all stations, including satellite station 25; however, because communication is impeded by the abnormality in satellite station 25, the fact that it has not yet been restored from its abnormal condition is regularly detected.

When the cause of abnormality of satellite station 25 is remedied and the station's operation is restored, it will respond to data transmitted from the master station 23. The master station 23 will detect the restoration of satellite station 25 when it receives answering data signal from satellite station 25.

When the master station 23 detects the remedy of the abnormal station, it transmits data signals that turns OFF all the relays 36-38 of satellite stations 24-26. Also, the master station 23 turns OFF relay 35. After master station 23 turns OFF relays 36, 38 and 35, it may take into consideration the delay time required for the transmission line to be reconnected in the loop transmission mode before recommencing transmitting data signals in the loop mode.

Thus, as described above, under normal conditions, data transmission is implemented in the loop transmission mode, which is the high-speed mode of transmission. However, when the operation of any of the plural number of satellite stations is interrupted by abnormal breakdown, data transmission is maintained uninterrupted by a switch to the bus transmission mode, although its transmission speed is slow. Moreover, since the master station can detect the abnormal breakdown of any station, the affected station can be identified so that corrective action can be taken and the system can be restored quickly to normality.

Also, when data is transmitted in the bus mode and service of the abnormal station is restored to normality, the system automatically reverts to the normal high-speed mode of data transmission; thus, the system's reversion to normal high-speed mode of transmission is readily achieved.

FIG. 3 illustrates the third feature of the invention. Here, the circuitry of a satellite station, which may be a communication device of many types in a variety of data transmission systems, is illustrated. In FIG. 3, 47 and 48 generally represent the communication devices, 49-51 the transmission lines connecting each of the communication devices, 52 and 53 the external switches for switching between the loop and bus transmission modes, 54 and 55 the internal circuitry of the communication devices, 56 and 57 the data receiving devices, 58 and 59 the transmitting devices, and 60 and 61 the pull-up resistors.

In operation, when the external switches 52 and 53 are OFF, the transmission lines 49-51, which connect each of the communication devices 47 and 48, form a loop. When the input of the input port of the internal circuitry 54 and 55 is raised to the "H" level, the loop mode of the communication devices 47 and 48 of the transmission system is detected; and data transmission is implemented in the loop mode.

Next, when the external switches 52 and 53 are turned ON, the transmission lines 49-51 that connect each of the communication devices 47 and 48 will connect them in parallel. Then the input of the input ports of the internal circuitry 54 and 55 will be lowered to the "L" level. As a result, the transmission devices 47 and 48 will be detected as being in the bus mode of transmission; and data transmission will be implemented in the bus mode.

As described above, in this transmission system, the communication devices' specifications are designed to optionally operate in either the loop or bus mode of transmission. Because the system is designed to switch between the two modes of transmission, the user's system configuration design would be more economical than if he were using either of the two, and had to purchase an alternative mode.

In connection with the first feature of the system, under normal conditions, a number of satellite stations receive data and control signals from the master station and communicates with it in the loop mode. However when an operational abnormality occurs in any of the satellite stations, the system is designed so that the transmission mode is switched to the bus mode. In other words, under normal conditions communication between the master and satellite stations is performed at high speed. However, when an abnormality occurs in any of the satellite stations, communication between the master and satellite stations can still be maintained uninterrupted under this dual-mode system.

In connection with a second feature of the invention, the system is designed so that when the master station detects that the abnormal satellite station's operation has been restored to normal, the communication mode between the master and satellite stations is switched automatically from the bus to the loop mode. As a result, the transmission system is automatically restored to the normal high-speed mode of communication.

In the third feature of the invention, the master and the plural number of satellite stations are equipped with an externally established means for switching between either the loop or bus mode of transmission. Thus, this system offers an option of readily and effectively switching the transmission mode effectively when necessary.

The entire disclosure of each and every foreign patent application from which the benefit of foreign priority has been claimed in the present application is incorporated herein by reference, as if fully set forth.

Although this invention has been described in at least one preferred form with a certain degree embodiment particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A transmission system for transmitting data and control signals comprising:
   a master station operative for transmitting control signals and for transmitting and receiving data signals;
   a plurality of satellite stations operative for receiving and transmitting control and data signals;
   transmission means connecting said master station and said satellite stations sequentially in a loop, each of said satellite stations being connected for receiving said control and data signals and for transmitting said signals to the following station in said loop;
   means for detecting an abnormality in at least one station; and
   means responsive to said detection to switch said system from a loop transmission mode to a bus transmission mode, which enables each of the satellite stations to directly communicate with the master station.

2. The transmission system according to claim 1, further comprising means for detecting the cure of said abnormality.

3. The transmission system according to claim 2, further comprising means responsive to said cure detection for commanding said stations to switch from said bus transmission mode to said loop transmission mode.

4. A transmission system comprising:
   a master station;
   a plurality of satellite stations;
   a common transmission trunk line connecting said master and said plurality of satellite stations for sequential communication in a loop, said master station being operative to transmit addressable signals periodically to each of said satellite stations via said line and each of said satellite stations being operative to periodically receive signals addressed to it and to relay other signals not addressed to it on said common line; and
   transmission switching means at each of said satellite stations for connecting said stations in a bus mode.

5. The transmission system of claim 4, wherein said switching means can be switched externally.

6. The transmission system of claim 4, wherein said switching means is responsive to a failure to receive a periodically transmitted signal.

7. The transmission system of claim 6, wherein said switching means comprises a watchdog timer, for detecting an abnormality in at least one of said satellite stations.

8. The transmission means of claim 4, wherein said switching means is switchable in response to a command from said master station 9. A method of maintaining the continuity of a transmission system having a master station and a plurality of slave stations connected sequentially in a loop by a transmission medium comprising:
   a) monitoring the signals sequentially transmitted via said medium;
   b) detecting an abnormality in said transmitted signals; and
   c) switching said loop-mode connection to a bus-mode connection of said stations.

10. The method of claim 9, further comprising monitoring said abnormality while in said bus-mode and, when said abnormality is removed, automatically switching said bus-mode to a loop mode connection.

11. The method of claim 9, further comprising externally switching between said bus-mode and said loop mode.

12. The method of claim 9, wherein said detecting step further comprises periodically checking for the presence of a periodic signal.

13. The method of claim 9, wherein said switching step further comprises commanding a slave station to switch between a loop-mode and a bus-mode by said master station.

14. The method of claim 13, wherein said switching step further comprises a slave station commanding itself to switch between a loop-mode and bus-mode.

15. The method of claim 9, further comprising testing for the presence of failures at slave stations while in said bus-mode and automatically switching to said loop mode when no failures are detected.

16. The method of claim 15, wherein said testing step is performed by said master station.

* * * * *